US006942188B2

(12) United States Patent
Tsay et al.

(10) Patent No.: US 6,942,188 B2
(45) Date of Patent: Sep. 13, 2005

(54) HANGING POLE WITH SUCKING DISK

(76) Inventors: Wen-Feng Tsay, P. O. Box 24-108, Taipei (TW); Ta-Shuo Chang, P. O. Box 24-108, Taipei (TW)

( * ) Notice: Subject to any disclaimer, the term of this patent is extended or adjusted under 35 U.S.C. 154(b) by 0 days.

(21) Appl. No.: 10/715,189

(22) Filed: Nov. 18, 2003

(65) Prior Publication Data

US 2005/0103962 A1 May 19, 2005

(51) Int. Cl.[7] ......................... F16B 47/00; A45D 42/14
(52) U.S. Cl. ............................... 248/205.8; 248/205.5; 248/362
(58) Field of Search .......................... 248/205.8, 205.5, 248/205.6, 205.7, 317, 362, 363

(56) References Cited

U.S. PATENT DOCUMENTS 2,028,640 A * 1/1936 Zaiger ..................... 248/205.8
2,047,658 A * 7/1936 Zaiger ..................... 248/205.8
2,370,938 A * 3/1945 Cohen ....................... 294/64.1
2,657,893 A * 11/1953 Puckert ................... 248/205.8
3,082,988 A * 3/1963 Holden .................... 248/205.8
4,133,575 A * 1/1979 Mader ....................... 296/95.1
6,045,111 A * 4/2000 Hsieh ......................... 248/551
6,234,435 B1 * 5/2001 Yeh ......................... 248/205.5
6,478,271 B1 * 11/2002 Mulholland .............. 248/205.8
6,669,033 B1 * 12/2003 Lian ........................ 211/87.01

* cited by examiner

*Primary Examiner*—Leslie A. Braun
*Assistant Examiner*—Tan Le
(74) *Attorney, Agent, or Firm*—Troxell Law Office, PLLC

(57) ABSTRACT

A hanging pole with a sucking disk including a sucking disk body with a threaded shaft on top and a rubber sucking disk on bottom, a compression stand with connecting sleeve on top and a shell plate on bottom, and a pole that connects to the connecting sleeve of the compression stand. The shell plate is smaller than the rubber-sucking disk. A through hole is on the center of the shell plate and leads to the slot hole on the middle of the compression stand; an adjustable threaded nut is inside the slot hole; the threaded shaft of the sucking disk body passes through the through hole of the compression stand and screws with the adjustable threaded nut. Users can adjust the adjustable threaded nut to move the sucking disk body back and forth to stick or loose the vacuum area in the center of the sucking disk and press the circumference of the rubber sucking disk firmly to generate a larger vacuum area for stronger sticking strength to offer the hanging pole a stronger sticking strength on the ceramic or glass wall.

4 Claims, 3 Drawing Sheets

HANGING POLE WITH SUCKING DISK

BACKGROUND OF THE INVENTION

I. Field of the Invention

This invention relates generally to a hanging pole and, more specifically, to a hanging pole with sucking disk that improves the reliability of the sticking strength and offers lower manufacturing cost. The present invention comprises of a sucking disk body with a threaded shaft on top and a rubber-sucking disk on bottom, a compression stand with connecting sleeve on top and a shell plate on bottom, and a pole that connects to the connecting sleeve of the compression stand. The shell plate of is smaller than the rubber-sucking disk. A through hole is on the center of the shell plate and leads to the slot hole on the middle of the compression stand; an adjustable threaded nut is inside the slot hole; the threaded shaft of the sucking disk body passes through the through hole of the compression stand and screws with the adjustable threaded nut. By the simplified structure and components, users can adjust the adjustable threaded nut to move the sucking disk body back and forth to stick or loose the vacuum area in the center of the sucking disk and press the circumference of the rubber sucking disk firmly to generate a larger vacuum area for stronger sticking strength to offer the hanging pole a stronger sticking strength on the ceramic or glass wall.

II. Description of the Prior Art

Heretofore, it is known that mobile phone holders, towel racks and hooks are fixed and fastened with screws and glues, they are not easy to be removed or changed position once fixed. Glass, ceramic wall with smooth surface and easy to be shattered materials are not easy to apply this method, the surface of the wall will be broken to apply. The known sucking disk hanging poles are lack of sucking strength or complex in structure with high cost.

SUMMARY OF THE INVENTION

It is therefore a primary object of the invention to provide a hanging pole with sucking disk comprises of a sucking disk body with a threaded shaft on top and a rubber sucking disk on bottom, a compression stand with connecting sleeve on top and a shell plate on bottom, and a pole that connects to the connecting sleeve of the compression stand. The shell plate of is smaller than the rubber-sucking disk. A through hole is on the center of the shell plate and leads to the slot hole on the middle of the compression stand; an adjustable threaded nut is inside the slot hole; the threaded shaft of the sucking disk body passes through the through hole of the compression stand and screws with the adjustable threaded nut. By the simplified structure and components, users can adjust the adjustable threaded nut to move the sucking disk body back and forth to make the sucking disk stick or loose on a smooth surface.

It is still an objective of this invention to provide a hanging pole with sucking disk in which the compression stand presses the circumference of the rubber sucking disk firmly to generate a larger vacuum area for stronger sticking strength.

BRIEF DESCRIPTION OF THE DRAWINGS

The accomplishment of the above-mentioned object of the present invention will become apparent from the following description and its accompanying drawings which disclose illustrative an embodiment of the present invention, and are as follows.

DESCRIPTION OF THE PREFERRED EMBODIMENT

Figure 1:
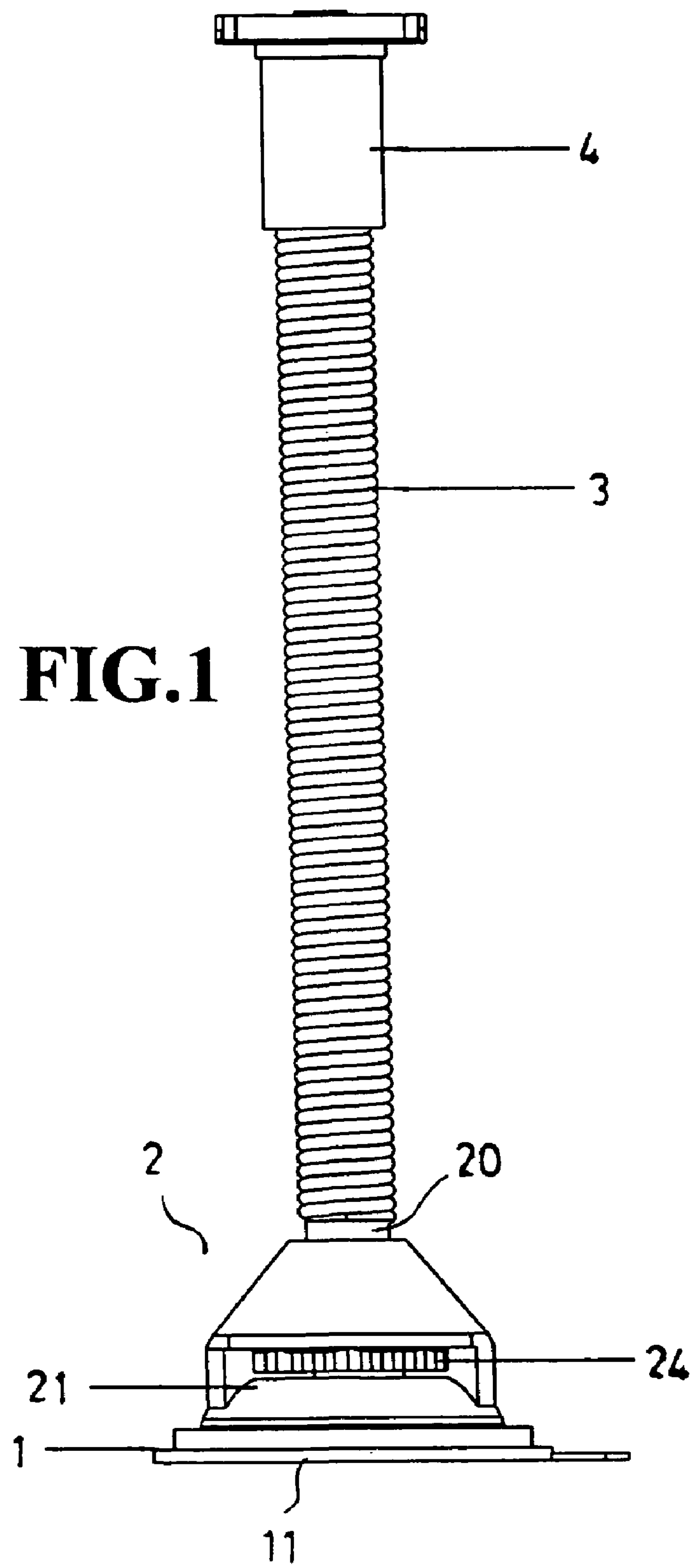
FIG. 1 is a perspective view of the present invention.
Figure 2:
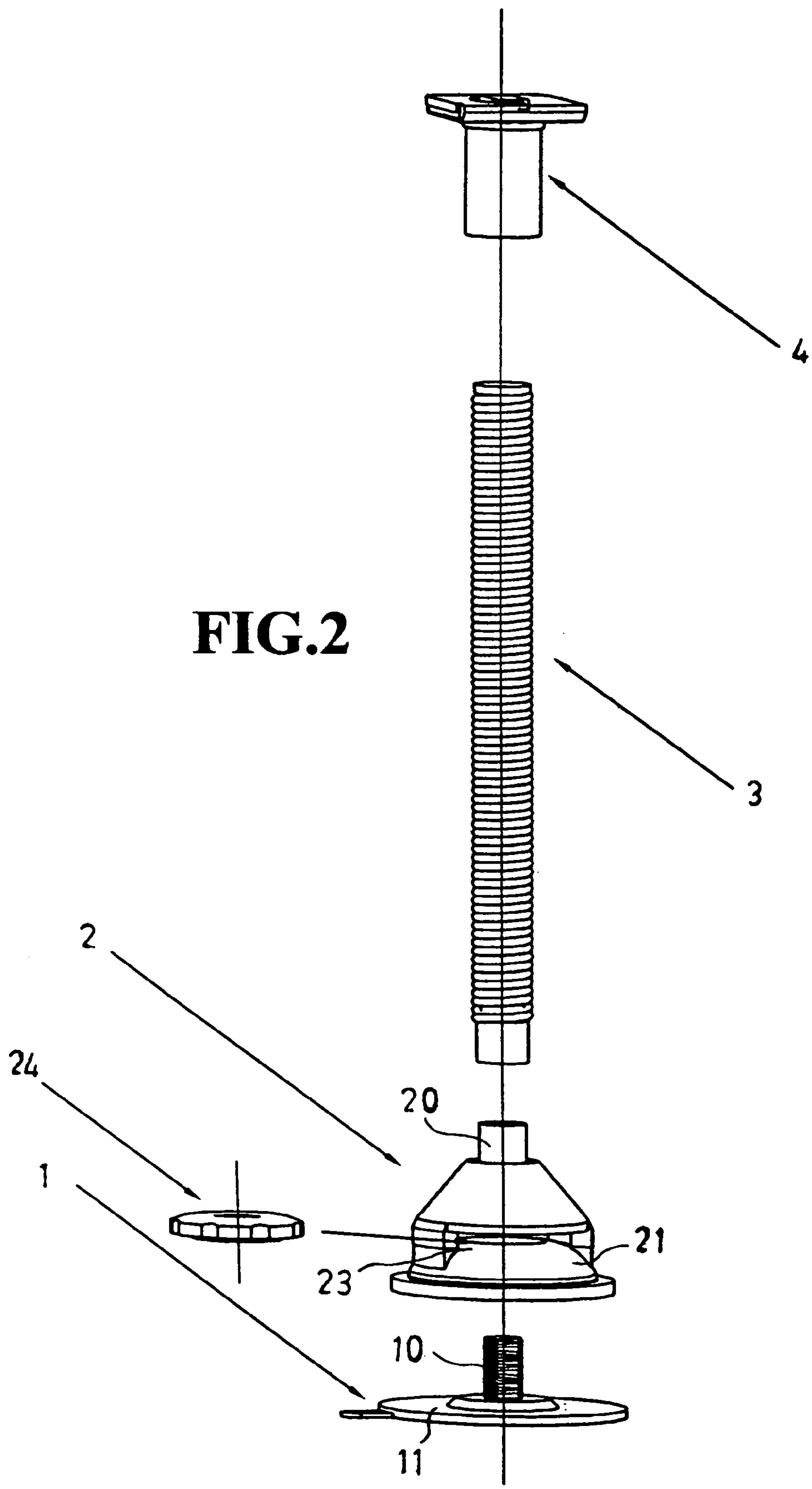
FIG. 2 is an assembly view of the present invention.
Figure 4:
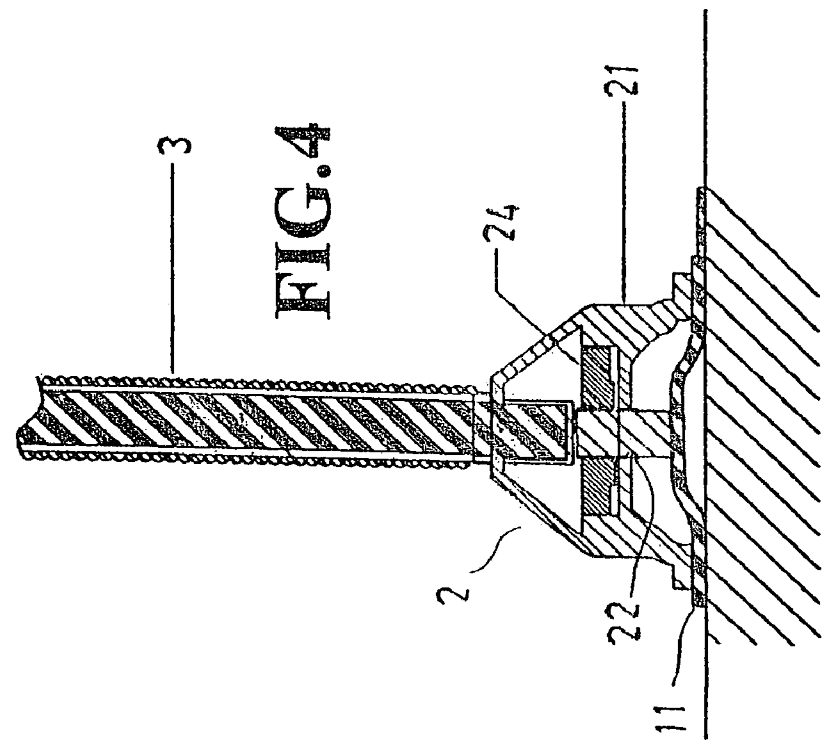
FIG. 4 is a final application state view of the present invention.
Figure 3:
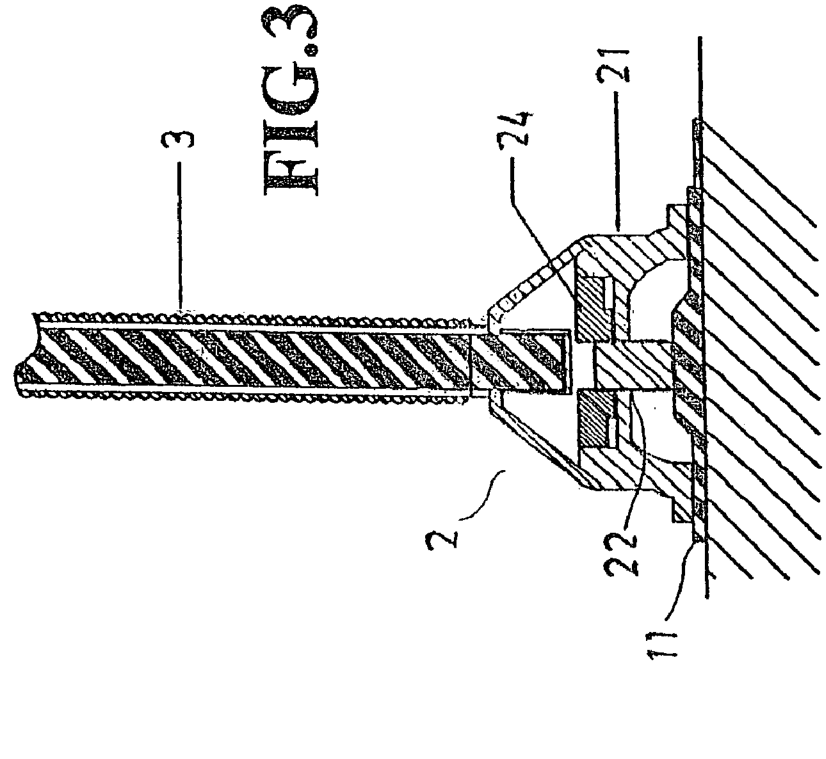
FIG. 3 is an initial application state view of the present invention.

The present invention is composed of a sucking disk body (1), a compression stand (2) and a pole (3). The sucking disk body (1) has a threaded shaft (10) on top and a rubber sucking disk (11) on bottom; the compression stand (2) has a connecting sleeve (20) on top and a shell plate (21) on bottom, the bottom of the shell plate (21) is in curve shape. The shell plate (21) of the compression stand (2) is smaller than the rubber sucking disk (11) of the sucking disk body (1). A through hole (22) is on the center of the shell plate (21), the through hole (22) leads to the slot hole (23) on the middle of the compression stand (2); an adjustable threaded nut (24) is inside the slot hole (23); the threaded shaft (10) of the sucking disk body (1) passes through the through hole (22) of the compression stand (2) and screws with the adjustable threaded nut (24). The connecting sleeve (20) of the compression stand (2) connects to the strong or stretchable pole (3) to hang articles; a fixing top (4) is on top of the pole (3) to stable articles.

The pole (3) can be made of a strong material or a stretchable material. The pole (3) can have a resilient member located on an outer circumference. The shaft (10), the threaded nut (24), and the shell plate (21) can be made of metal or other hard material.

In real application, users can tighten the adjustable threaded nut (24) to have the rubber sucking disk (11) of the sucking disk body (1) move forward, and press, stick the rubber sucking disk (11) against the ceramic or glass wall, then adjust the adjustable threaded nut (24), the adjustable threaded nut (24) is pulled by the threaded shaft (10) to bring the shell plate (21) of the compression stand (2) forward to press the circumference of the rubber sucking disk (11) firmly. The shell plate (21) is made of hard material, if users keep adjusting, the shell plate (21) stops and makes threaded shaft (10) move backward, at the same time, the rubber sucking disk (11) is pulled backward, the circumference of the rubber sucking disk (1) is firmly pressed by the shell plate (21) that makes the vacuum area in the center of the rubber sucking disk (11) become larger, the larger the vacuum area, the larger the sticking strength to increase the loading strength of the pole (3). When users loose the adjustable threaded nut (24) to have the vacuum area of the rubber sucking disk (11) move backward to original state and bring the shell plate (21) back to break away from the rubber sucking disk (11), users can easily remove the whole set.

While a preferred embodiment of the invention has been shown and described in detail, it will be readily understood and appreciated that numerous omissions, changes and additions may be made without departing from the spirit and scope of the invention.

What is claimed is:

1. A hanging pole with a sucking disc comprising:

a) a sucking disc body having:

i) a threaded shaft; and ii) a rubber sucking disc;

b) a compression stand having:

i) a shell plate having a through hole, the threaded shaft being inserted through the through hole, the shell plate has an outer diameter smaller than an outer diameter of the rubber sucking disc;

ii) a connecting sleeve; and iii) a slot hole located between the shell plate and the connecting sleeve;

c) a threaded nut located in the slot hole and threadedly connected to the threaded shaft, wherein the threaded nut selectively moves the rubber sucking disc between first and second positions to create a vacuum; and d) a pole connected at a first end to the connecting sleeve.

2. The hanging pole according to claim 1, wherein the shell plate has a curved shape.

3. The hanging pole according to claim 1, wherein the pole is stretchable.

4. The hanging pole according to claim 1, further comprising a fixing top connected to a second end of the pole.

* * * * *